(12) United States Patent
Erhart et al.

(10) Patent No.: US 7,950,182 B2
(45) Date of Patent: May 31, 2011

(54) HARVESTING METHOD AND APPARATUS FOR LEAFY VEGETABLES OR LEGUMES

(75) Inventors: Graham Erhart, Withcott (AU); Wendy Erhart, Withcott (AU)

(73) Assignee: Withcott Group Pty Ltd (AU)

( * ) Notice: Subject to any disclaimer, the term of this patent is extended or adjusted under 35 U.S.C. 154(b) by 779 days.

(21) Appl. No.: 11/793,088

(22) PCT Filed: Dec. 14, 2005

(86) PCT No.: PCT/AU2005/001894
§ 371 (c)(1),
(2), (4) Date: Feb. 7, 2008

(87) PCT Pub. No.: WO2006/063400
PCT Pub. Date: Jun. 22, 2006

(65) Prior Publication Data
US 2009/0044507 A1    Feb. 19, 2009

(30) Foreign Application Priority Data
Dec. 15, 2004   (AU) ................. 2004237918

(51) Int. Cl.
| A01B 79/00 | (2006.01) |
| A01B 79/02 | (2006.01) |
| A01C 1/00  | (2006.01) |
| A01G 1/00  | (2006.01) |
| A01H 3/00  | (2006.01) |

(52) U.S. Cl. ................................... 47/58.1 R

(58) Field of Classification Search ............... 47/58.1 R; 452/170, 177, 178, 179, 180, 181, 182; 83/155, 83/404, 404.2, 404.3, 404.4
See application file for complete search history.

(56) References Cited

U.S. PATENT DOCUMENTS

| 3,163,066 | A | * | 12/1964 | Beauiieu et al. ............... 83/91 |
| 3,347,121 | A | * | 10/1967 | Wiatt ........................... 83/76.4 |
| 3,541,907 | A | * | 11/1970 | Wiatt et al. ..................... 83/23 |
| 3,683,731 | A | * | 8/1972 | Oppenheim et al. ............. 83/56 |
| 4,909,139 | A | * | 3/1990 | Montano et al. ............... 99/537 |
| 4,967,545 | A |   | 11/1990 | Fischer et al. |
| 5,193,331 | A |   | 3/1993 | Quandt |
| 5,964,081 | A |   | 10/1999 | Ingram |
| 6,056,064 | A | * | 5/2000 | deVries ......................... 172/20 |
| 6,173,559 | B1 |   | 1/2001 | Nevarez, Sr. |
| 6,378,281 | B1 |   | 4/2002 | Ottaway |
| 6,463,722 | B1 |   | 10/2002 | de Groot |

FOREIGN PATENT DOCUMENTS

| JP | 04-370016 | 12/1992 |
| JP | 2002-191216 | 7/2002 |

* cited by examiner

*Primary Examiner* — Timothy D Collins
*Assistant Examiner* — Monica Williams
(74) *Attorney, Agent, or Firm* — Hoffmann & Baron, LLP (57) ABSTRACT

A harvesting apparatus comprising a first conveyor (30) for conveying seedling trays (10), a cutting station (40) adjacent the first conveyor (30) to cut the leaves of the seedlings and a second conveyor (41) for taking cut leaves away from the cutting station (40). A stationary plate or grill (82) is placed in the gap (82A) between the first conveyor (30) and the cutting station (40) for supporting the trays (10). The cutting mechanism at the cutting station (40) may be adjustable in height above the plate or grill (82). A method of harvesting leafy vegetables and legumes using this apparatus is also described.

6 Claims, 9 Drawing Sheets

HARVESTING METHOD AND APPARATUS FOR LEAFY VEGETABLES OR LEGUMES

CROSS-REFERENCE TO RELATED APPLICATIONS

This is the National Stage filing in the U.S. of International Application No. PCT/AU2005/001894, filed Dec. 14, 2005, which claims priority to Australian Application No. 2004237918, filed Dec. 15, 2004, the contents of which are incorporated by reference herein.

FIELD OF THE INVENTION

This invention relates to a harvesting method and apparatus for leaf vegetables or legumes which are normally used in salads.

Leaf vegetables include spinach, lettuce, asian greens including bok choy and silverbeet and leaf legumes may include snow peas and lentils.

The invention is also application to members of the Brassica family that include broccoli such as asparagus broccoli and leafy cabbages such as pak-choi and ornamental cabbages. However a very common leafy vegetable used in salads is baby leaf lettuce which comes in a variety of shapes and colours and thus may have broad leaves, curly leaves or reddish leaves.

The invention is also applicable to a wide variety of lettuce type greens including tango, lolla rosa, red oak leaf, baby romaine, green oak leaf, baby red romaine, baby leaf spinach, baby red chard, red mustard, Tatsoi, Mizuma, Frisee, arugula, radicchio, herbs and curly endives known in the trade as "baby greens" and used in salads and garnishes.

BACKGROUND OF THE INVENTION

Baby salad is normally planted in a greenhouse and is harvested about 14-50 days after planting. Lettuce is normally planted in consecutive plantings so that there is a supply growing throughout the season. This means that as soon as the first planting has germinated and emerged the second planting is seeded. Leaf lettuces are normally harvested by hand into cartons in the field before being held in cold storage or shipped directly to wholesale distributors. Shelf life for lettuce is approximately two weeks so therefore it will be appreciated that time is of the essence in shipping the leaf lettuce to the wholesale distributors. However manually picking the leaf lettuce into cartons in the field is time consuming and inefficient. Use of a leafy vegetable harvester as described for example in U.S. Pat. No. 6,463,722 which is a mechanical harvester having a cutting assembly that cuts leafy vegetables such as baby greens in the field and deposits the cut leaves onto collection belts for ultimate location in storage bins is also time consuming and inefficient. Similar comments apply to mechanical leafy vegetable harvesters as described in U.S. Pat. Nos. 6,378,281, 6,173,559, 4,967,545 and 5,193,331.

Reference may be made to U.S. Pat. No. 5,964,081 which describes a baby greens harvester having a cutter/conveyor assembly fixed to a chassis so that the cutter/conveyor assembly may rotate about a generally horizontal axis. The baby greens after delivery by a conveyor belt to a cutting assembly are cut and the produce is then delivered into a produce box through a chute. However use of such a harvester was also found deficient because it could not be applied successfully to seedlings and was applicable only to fully grown produce in the field.

Reference also may be made to the November 2002 issue of the Australian periodical "Good Fruit and Vegetables" which describes a harvesting process wherein initially baby leaf lettuce leaves are grown in a seedling tray and taken to a harvesting machine and fed under a reciprocating blade which cuts off the leaves just above the tray surface. Detached leaves pass onto an upwardly inclined inspection or lift conveyor whereby they are inspected before delivery into containers. When full, the containers are taken to a cool room before transportation to a further processing facility by refrigerated vehicles. Use was made of a specially designed Williames Hi-Tech machine for harvesting the seedling leaves.

However it was found in practice using the above process that the harvesting machine was subject to frequent stoppages and there were gaps present between adjacent seedling trays which were mounted on a feed conveyor which transported the seedling trays to the reciprocating blade. This was because the feed conveyor comprised a stationary frame having a pair of chains at each side of the frame whereby each chain had a plurality of spaced lugs for pushing the seedling trays on the frame through to the reciprocating blade. When the gaps were present between adjacent trays it was found that often seedlings or leaves fell through the gaps located between spaced transverse frame members located on the conveyor frame. The gaps appeared because the spacing between the adjacent pusher lugs exceeded the length of the seedling trays which were of the order of 700 mm. Also the lift conveyor transporting the harvesting leaves from the cutting station was located above the reciprocating blade at a height which was excessive and thus this interfered with efficient removal of the harvested leaves from the reciprocating blade because the leaves jammed up on each side of the lift conveyor.

SUMMARY OF THE INVENTION

It is an object of the invention to provide a harvesting process which alleviates at least to some extent the disadvantages of the prior art discussed above.

The harvesting process of the invention includes the steps of:
(i) transporting a plurality of seedling trays wherein each seedling tray abuts each other on a conveyor belt to a cutting station wherein each seedling tray contains a plurality of seedlings whereby leaves of each seedling project above their associated seedling tray;
(ii) cutting the leaves contained in each seedling tray which passes through the cutting station which is spaced from an adjacent end of the conveyor belt to provide a gap between the cutting station and said adjacent end wherein said gap has a stationary support for supporting a respective seedling tray while the leaves are being cut; and
(iii) transporting the harvested leaves from the seedling tray on an upwardly inclined conveyor belt away from the cutting station.

Preferably in the method of the invention the seedlings are initially cultivated in a greenhouse wherein the seedlings are propagated and grown in the same seedling tray used in step (i) above. In this embodiment a plurality of seedling trays may be supported on support frames in the greenhouse and subjected to appropriate irrigation which may be automatically applied or timed as appropriate. There also may be provided nutrient drips which may be applied to each seedling by fertigation.

When the leaves reach a suitable height for consumption the seedling trays may be transported from the greenhouse to a harvesting location or harvesting shed.

Each tray may then be placed on a first conveyor and each tray abuts each other so that when a particular tray reaches the cutting station the leaves of each of the seedlings may be subjected to a cutting operation and the cut leaves may then be removed from the cutting station by a second conveyor.

At the cutting station each seedling after processing may then be removed in a direction below the cutting station containing the stalks and growth media for ultimate cleaning or vibration to remove relevant detritus and then stored for re use in the greenhouse.

The invention in other aspect may include harvesting apparatus for harvesting leafy vegetables or legumes which includes
  (i) first conveying means including an endless conveyor belt for conveying a plurality of seedling trays wherein each seedling tray has a plurality of seedlings wherein leaves of each seedling project above their associated seedling tray;
  (ii) a cutting station located adjacent a proximal end of the conveying belt and spaced therefrom to provide a gap between the cutting station and the proximal end of the conveyor belt, said cutting station having a cutting mechanism to cut the leaves from their associated stalks of a particular tray as it passes through the cutting station;
  (iii) a stationary support located in the gap for supporting seedling trays as they are deposited on said stationary support by the conveyor belt before passing through the cutting station; and
  (iv) second conveying means for conveying cut leaves away from the cutting station.

Preferably in the apparatus of the invention the second conveying means is a conveyor having an endless conveying belt which may be driven by one or more drive rollers. The belt may also be supported by one or more idler rollers. The endless conveyor belt of the first conveying means may also have a similar construction.

The cutting station may have a frame for supporting the cutting mechanism. Suitably the cutting mechanism may be adjustable in height above the stationary support which may be a stationary plate or grille located below the cutting mechanism which may separate the first and second conveyors. This is useful to enable the apparatus of the invention to process different plants and thus a variety of different leafy legumes or vegetables may be processed by the apparatus of the invention. This may be carried out by providing an upper frame which supports the cutting mechanism which is moveable relative to a lower frame so as to adjust the cutting height of the cutting mechanism above the stationary plate or grille. Such upper frame may have one or more upright frame members telescopically engaged with lower frame members of the lower frame to provide the relevant movement of the cutting mechanism that may be required. Such movement may cover a range of 0-130 mm.

Suitable actuating means may be provided for achieving movement of the upper frame relative to the lower frame such as jacking means exemplified by a scissor jack which interconnects the upper and lower frames. However this does not preclude the use of other forms of actuating means such as a hydraulic or pneumatic ram assembly.

The cutting mechanism may be of any suitable type and thus comprise a reciprocating blade or bandsaw as herein after described. However it will be appreciated that other forms of cutting mechanism could be used such as a movable cutter in conjunction with a stationary cutter or other forms of mechanical shearing means.

The apparatus of the invention may also comprise a collection means for receiving discarded seedling trays after they have passed through the cutting station and in one form such collection means may comprise a collection receptacle or more preferably a conveyor for conveying the trays to a storage location. Such conveyor may comprise an endless moveable belt but preferably has a series of spaced rollers attached to a roller support frame.

BRIEF DESCRIPTION OF THE DRAWINGS

Reference may now be made to a preferred embodiment of the invention wherein.

DETAILED DESCRIPTION OF PREFERRED EMBODIMENTS

Figure 1:
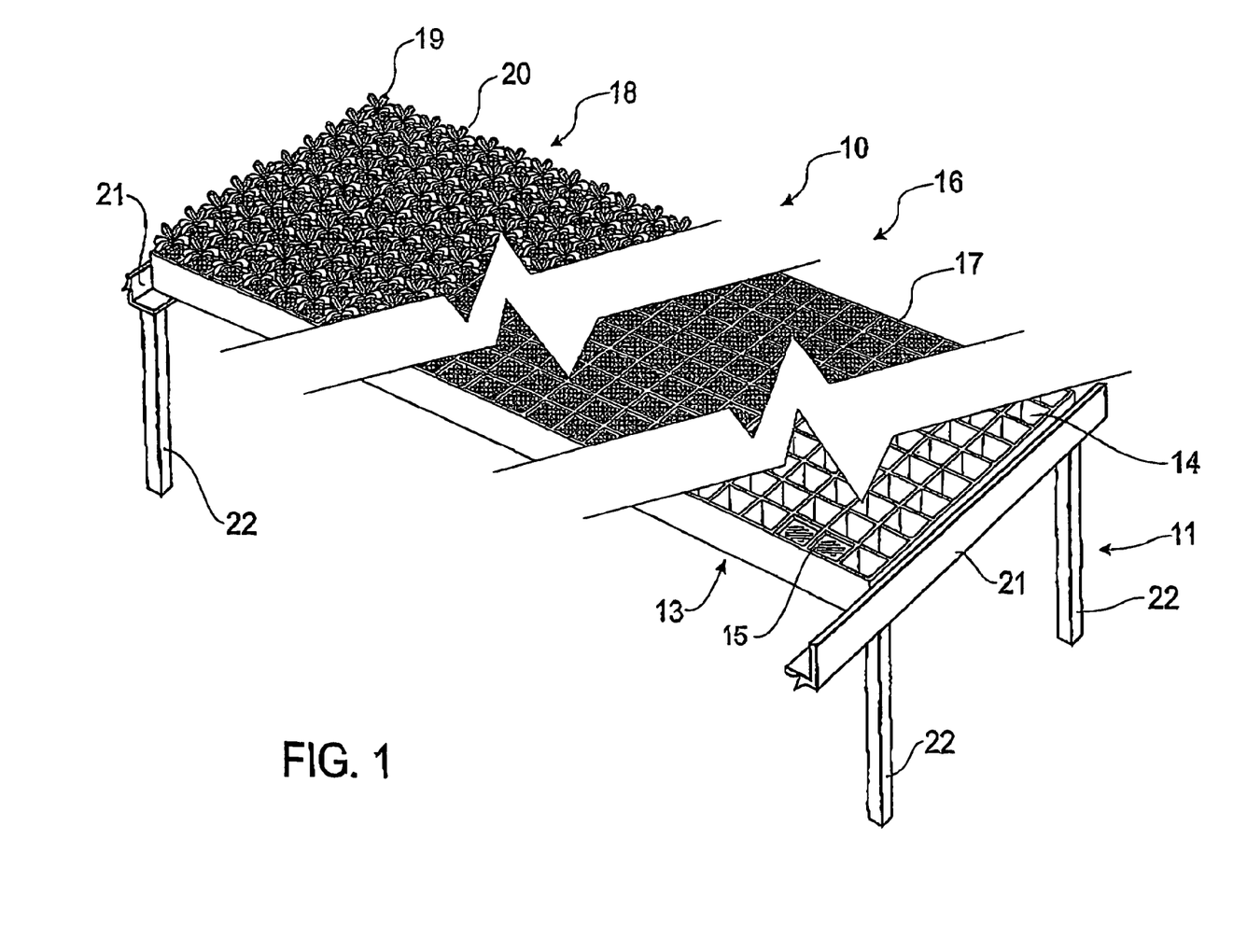
FIG. 1 is a perspective view of seedling trays being cultivated in a greenhouse.
Figure 2:
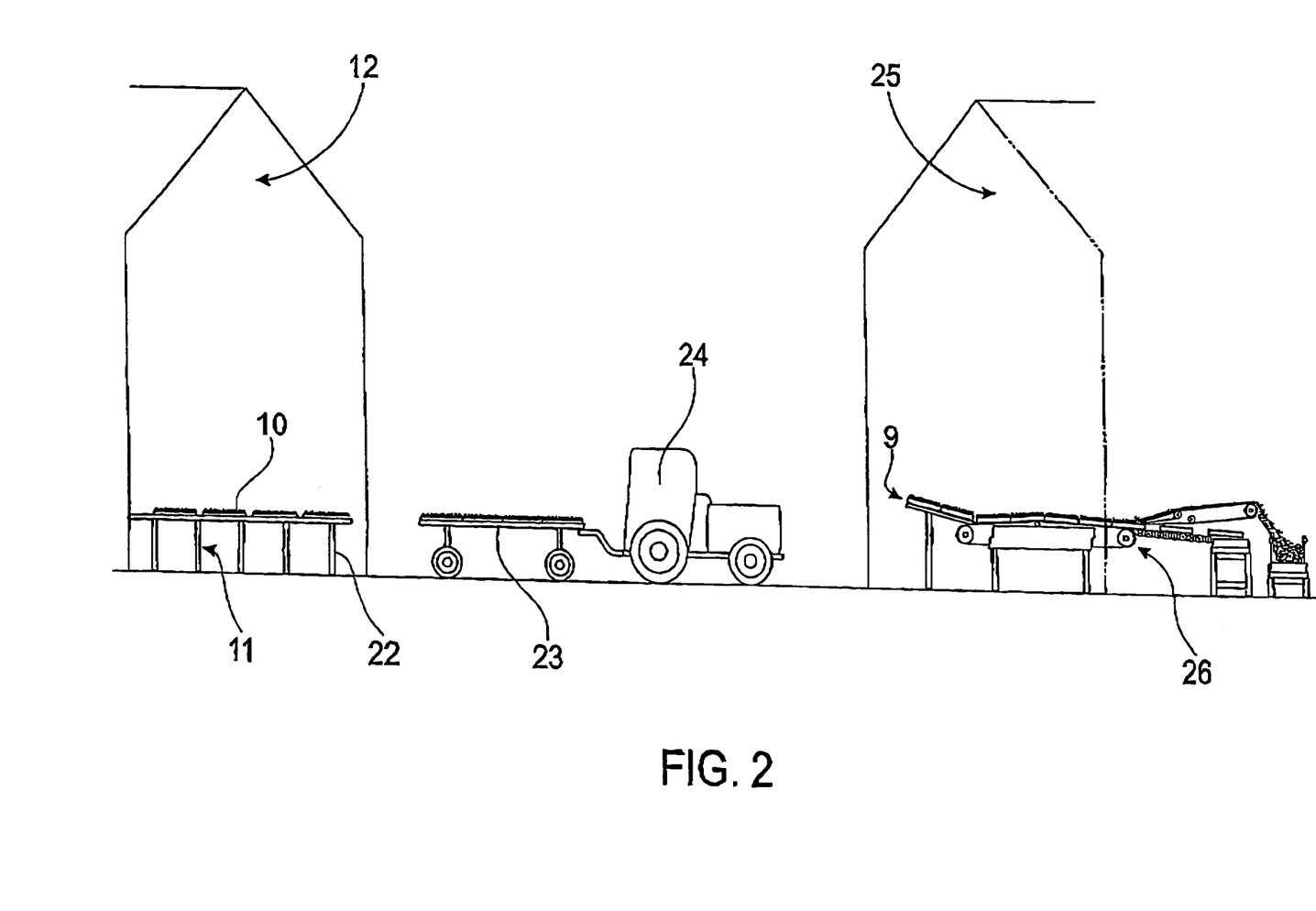
FIG. 2 is a schematic view showing transportation of the seedling trays from the greenhouse to a harvesting shed.

In FIG. 1 there is shown a seedling tray 10 which is cultivated on support frames 11 in a green house 12 shown in FIG. 2. The seedling trays 10 is shown in three stages of cultivation which include stage 13 when the recesses 14 of seedling tray 10 are empty or filled with growth medium 15 such as potting mix soil and other growth nutrients. In stage 16 the recesses 14 have sprouts or shoots 17 emerging from the growth medium 15 and finally stage 18 when each recess 14 contains leaves 19 of a particular seedling 20.

The seedling trays 10 are supported on L shaped frame members 21 such as angle iron of support frame 11 supported by legs 22 and are preferably contained in a vast greenhouse 12 which may be supplied with appropriate watering systems (not shown). The greenhouse 12 is useful in preventing adverse climatic conditions such as frost adversely effecting seedlings 20. As shown in FIG. 2 when leaves 19 have reached a suitable height the trays 10 are transported on trailers 23 pulled by tractors 24 to harvesting shed 25 where the trays are subjected to harvesting apparatus 26.

Figure 3:
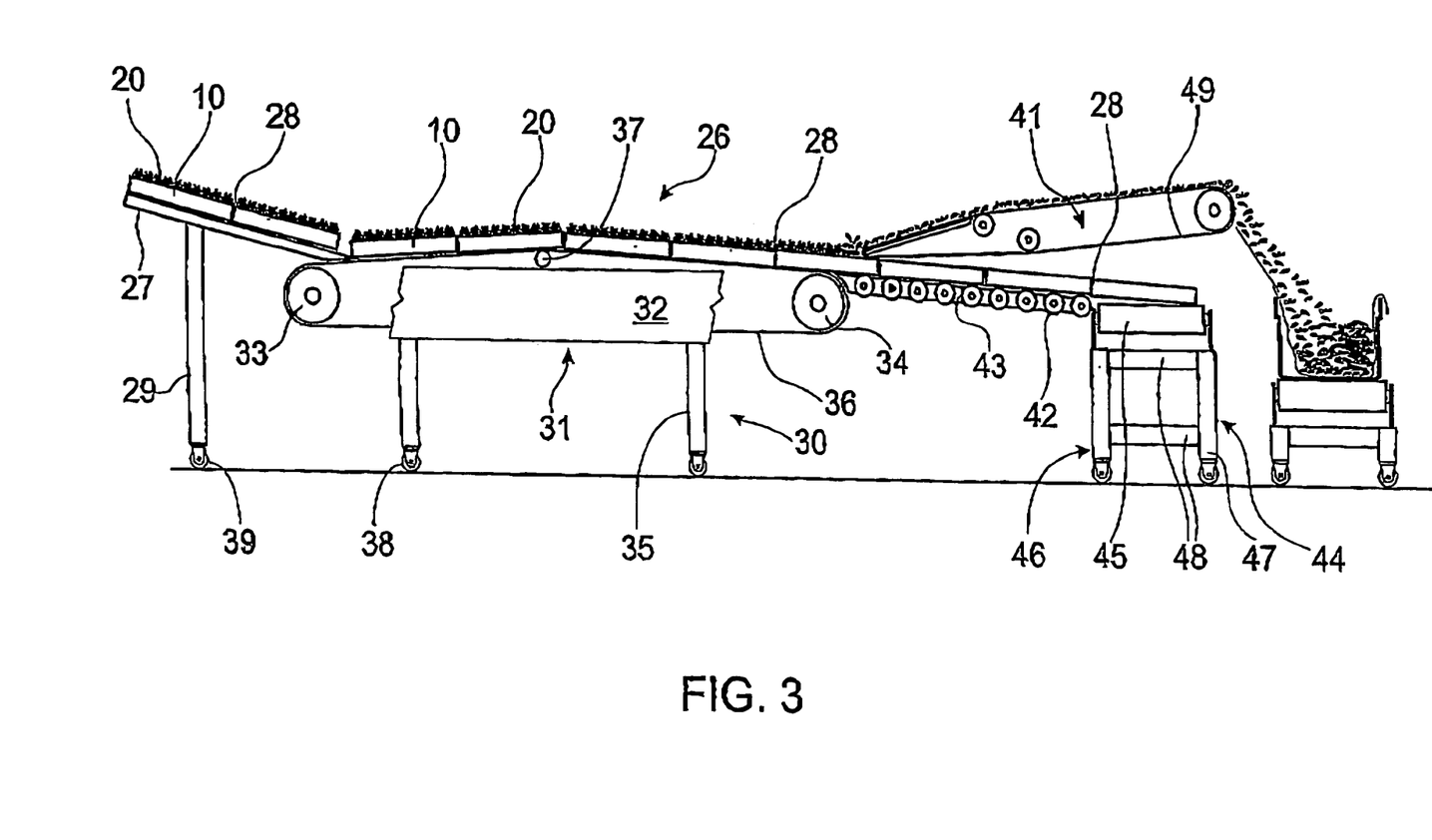
FIG. 3 is a schematic view showing the harvesting of the seedlings in the harvesting shed.
Figure 4:
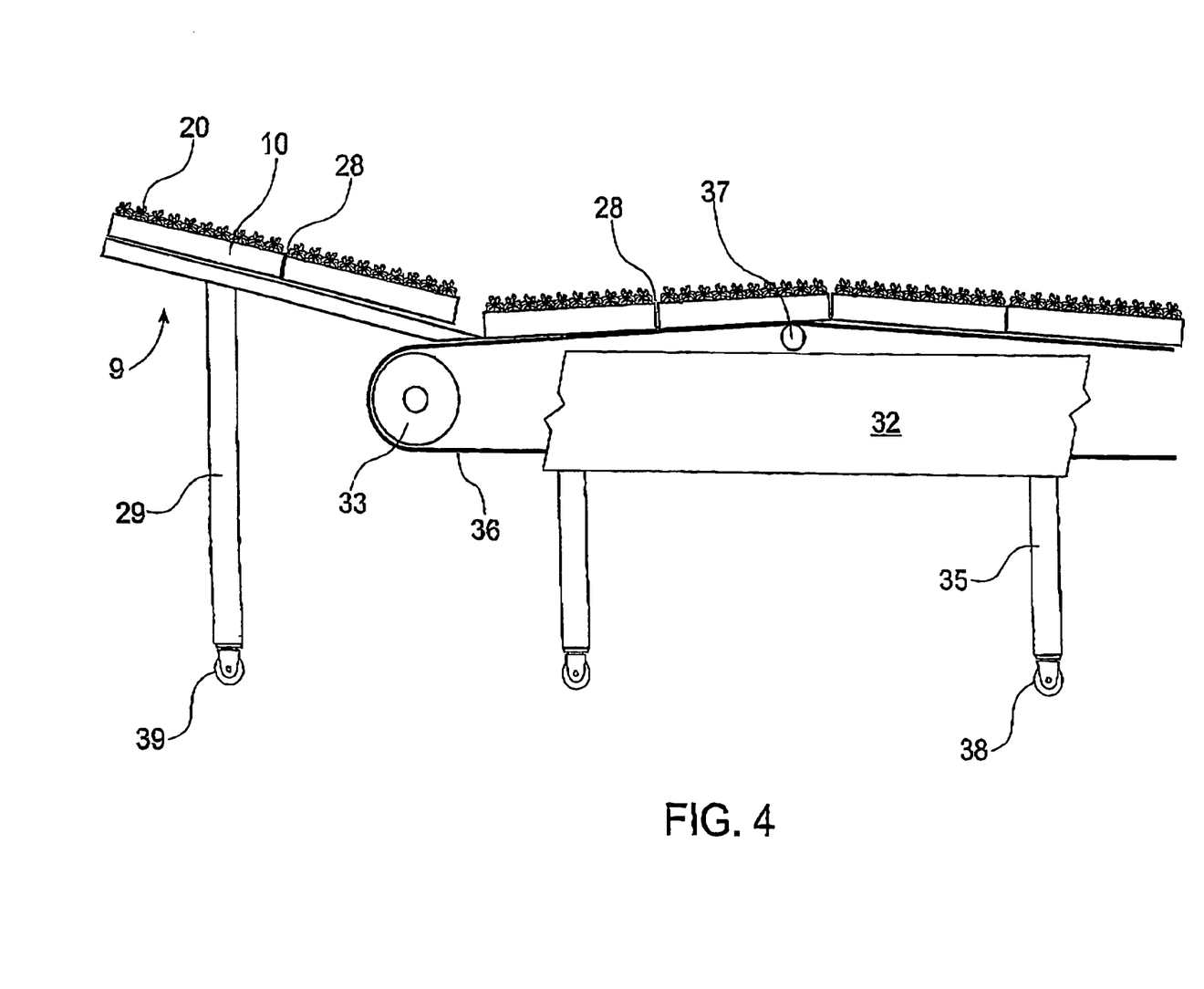
FIG. 4 is a more detailed view of loading of the seedling at a loading station tray onto a conveyor belt which transports the seedling trays at a cutting station

In harvesting apparatus 26 as shown in FIG. 3 the trays 10 are loaded manually onto ramps 27 at loading station 9 from trailer 21 and it is important that each tray 10 abuts each other at 28. Ramps 27 are supported by legs 29. The trays 10 are transferred to horizontal conveyor 30 having frame 31 having side plates 32 which are broken away for convenience to show idler roller 33 and drive roller 34. The conveyor 30 has a belt 36 tensioned by tensioning rollers 37. A more detailed view of loading of seedling trays 10 onto conveyor belt 36 is shown in FIG. 4. Conveyor 30 if desired may have legs 38 supported by wheels 38 shown in phantom. Legs 29 of ramp 27 may also be supported by ground engaging wheels 39.

Figure 5:
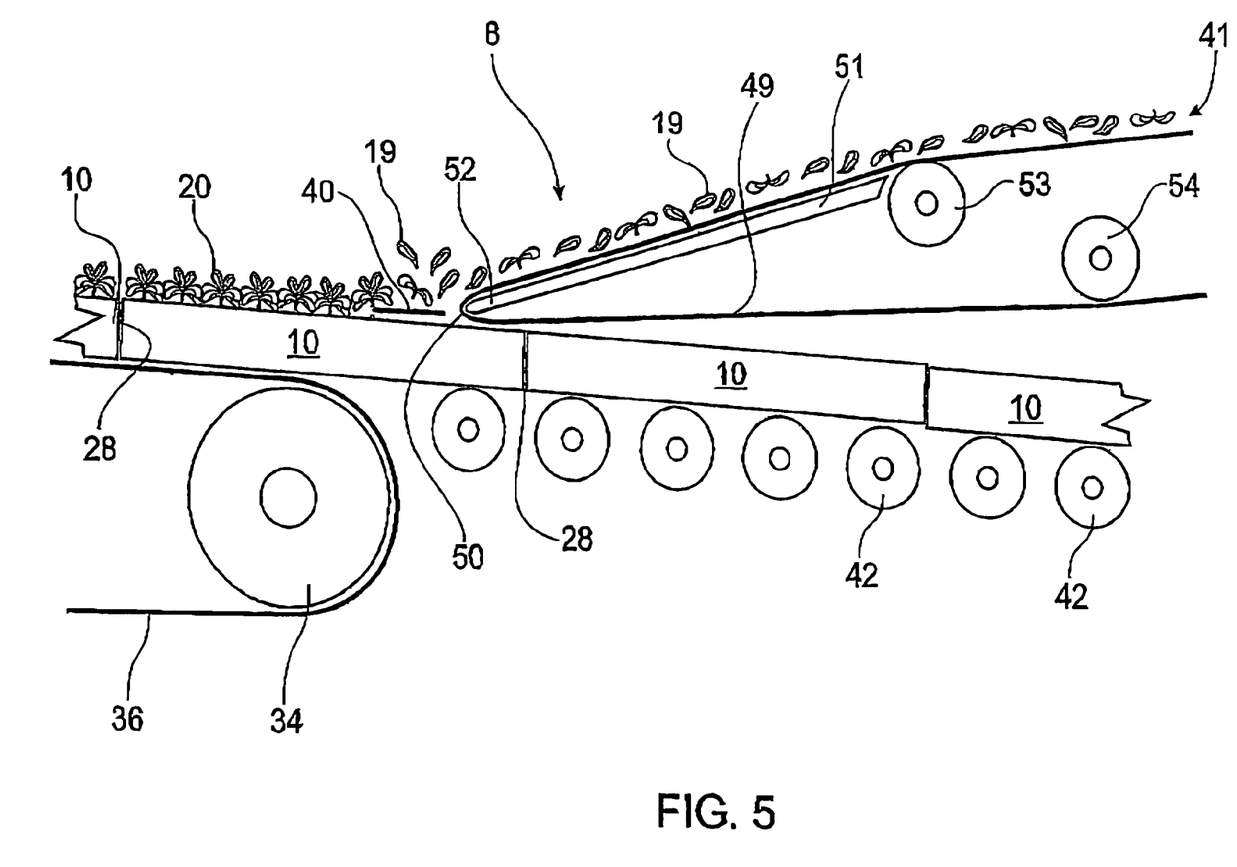
FIG. 5 shows a schematic view of the cutting of seedlings at the cutting station with the seedling trays being separated from the cut seedlings

In FIGS. 3-5 the seedling trays 10 are shown being conveyed by conveyor belt 36 to cutting station 8 where leaves 19 of seedlings 20 are cut by cutting mechanism 40. The leaves 19 are then transferred to an angled conveyor 41 with the trays 10 being passed below cutting station 8 to be transported by rollers 42 supported on frame 43 to a roller conveyor 44 having rollers 45 wherein trays 10 are either discarded or cleaned out by removal of growth medium 15 by suitable vibrating means (not shown) for re use. Roller conveyor 44 is supported by frame 46 having legs 47 and cross members 48. Roller conveyor 44 is oriented transversely to the longitudinal axis of conveyor 30. As best shown in FIG. 5 the conveyor 41 is provided with a conveyor belt 49 which is provided with a nose having a sharp curve or narrow radius 50 to facilitate operation of cutting mechanism 40 at cutting station 8. Suitably nose 50 is located 10-15 mm above support grille 82 discussed hereinafter. The sharp curve is provided by a wedge plate 51 having a pointed end 52 which is located below conveyor belt 47. The conveyor belt 41 is also provided with idler rollers 53 and 54.

Figure 6:
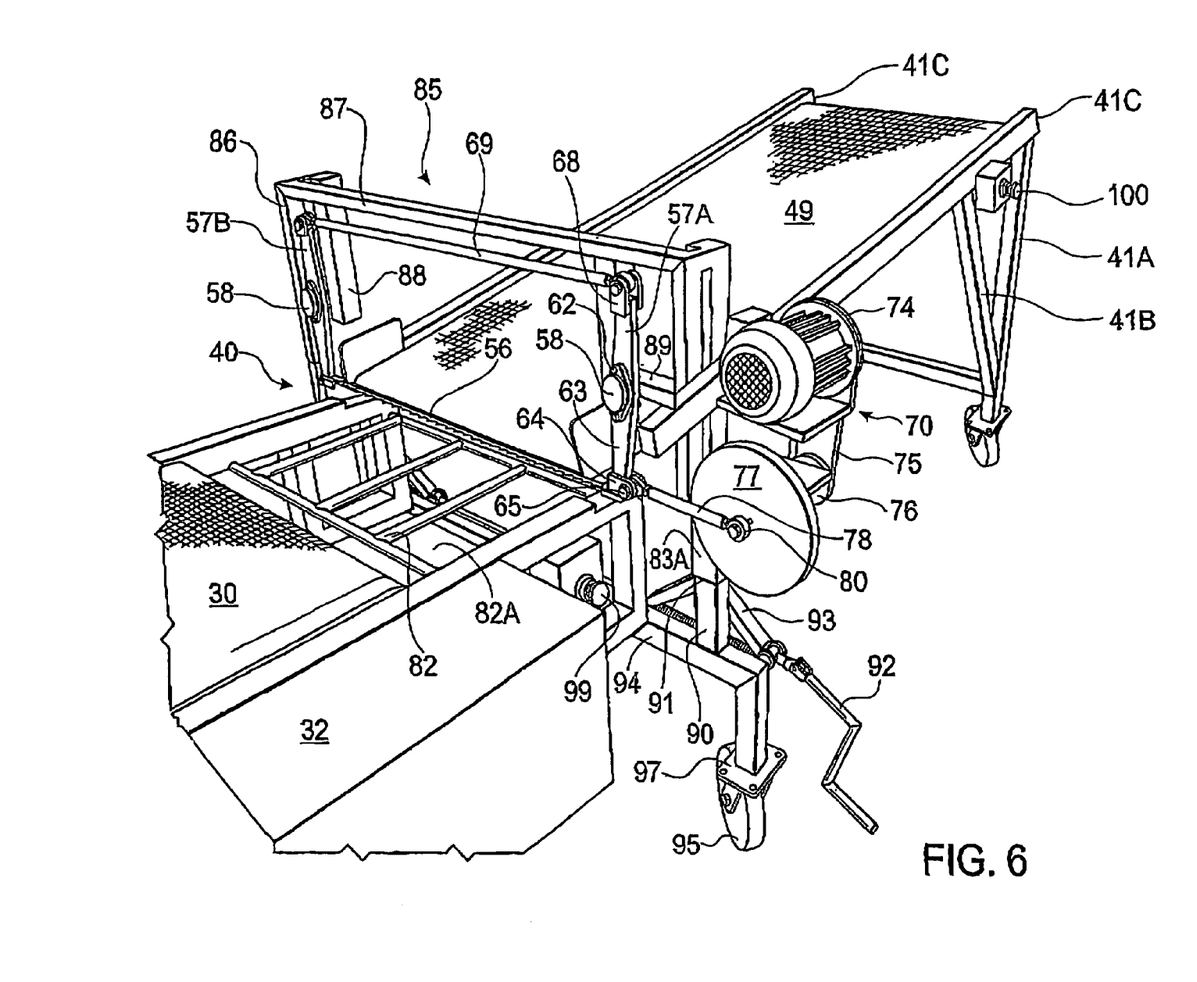
FIG. 6 shows a detailed view of one form of cutting mechanism for use in the invention at the cutting station

In FIG. 6 there is shown one form of cutting mechanism 40 for use in the invention comprising a reciprocating blade 56 which is pivotally attached to a pair of opposed rocker arms 57A and 57B which each pivot about a pivot pin or joint 58. There is also provided bearings 62. Each rocker arm 57 at its lower end 63 is retained within a clevis assembly 64 by pivot pin 65. At each top end of each rocker arm 57 there is proved the tie rod bearings 68 which also attach the link rod 69 to each rocker arm 57A or 57B.

There is also provided a drive means 70 for reciprocating blade 56 which comprises a drive motor which has an upper pulley 74 attached to a drive shaft (not shown) of the motor 70. The upper pulley 74 engages with belt 75 which also engages with lower pulley 76 and which engages with a drive shaft (not shown) and bearing (not shown) for fly wheel 77 which engages with connection rod 78 which engages with clevis 64. Connection rod 78 is also pivotally attached to projection 80 of fly wheel 77. When drive motor 70 is actuated this results in rotation of lower pulley 76 which causes rotation of fly wheel 77. This in turn causes movement of blade 56 through movement of rocker arms 57A and 57B.

As the seedling trays 10 pass through cutting station 8 because they abut each other at 28 this causes continued movement of seedling trays 10 over support grille 82. Support grille 82 located below blade 56 and facilitates transfer of seedling trays 10 onto rollers 42 below conveyor 41 which moves cut leaves 19 from cutting station 8 as shown in FIG. 5. Conveyor 41 is provided with support legs 41A and braces 41B as well as longitudinal frame members 41C.

There is also shown support frame 85 for cutting mechanism 40 having uprights 86 and cross members 87. Rocker arm 57A s attached to frame member 88 by pivot pin 58 and the rod bearings 68 and rocker arm 57B is attached to frame member 89. This means that the height of blade 56 may be adjusted by upper or lower movement of support frame 85 and it will be noted that each frame member 83A is telescopically engaged with a lower frame member 90 at 91 and such movement may be controlled by control lever 92 which causes actuation of scissor jack 93 to thereby cause elevating or lowering of support frame 85 relative to a lower frame comprising frame members 90 and axle frame member 94. Each lower frame member 90 is rigidly attached to axle frame member 94 which has attached thereto caster wheels 95 by bracket assemblies 97. Conveyor 30 may be actuated by control knob 99 and conveyor 41 may be actuated by control knob 100. Scissor jack 89 is rigidly attached to upright 86 at a suitable location (not shown) as well as to axle frame member 94.

Figure 7:
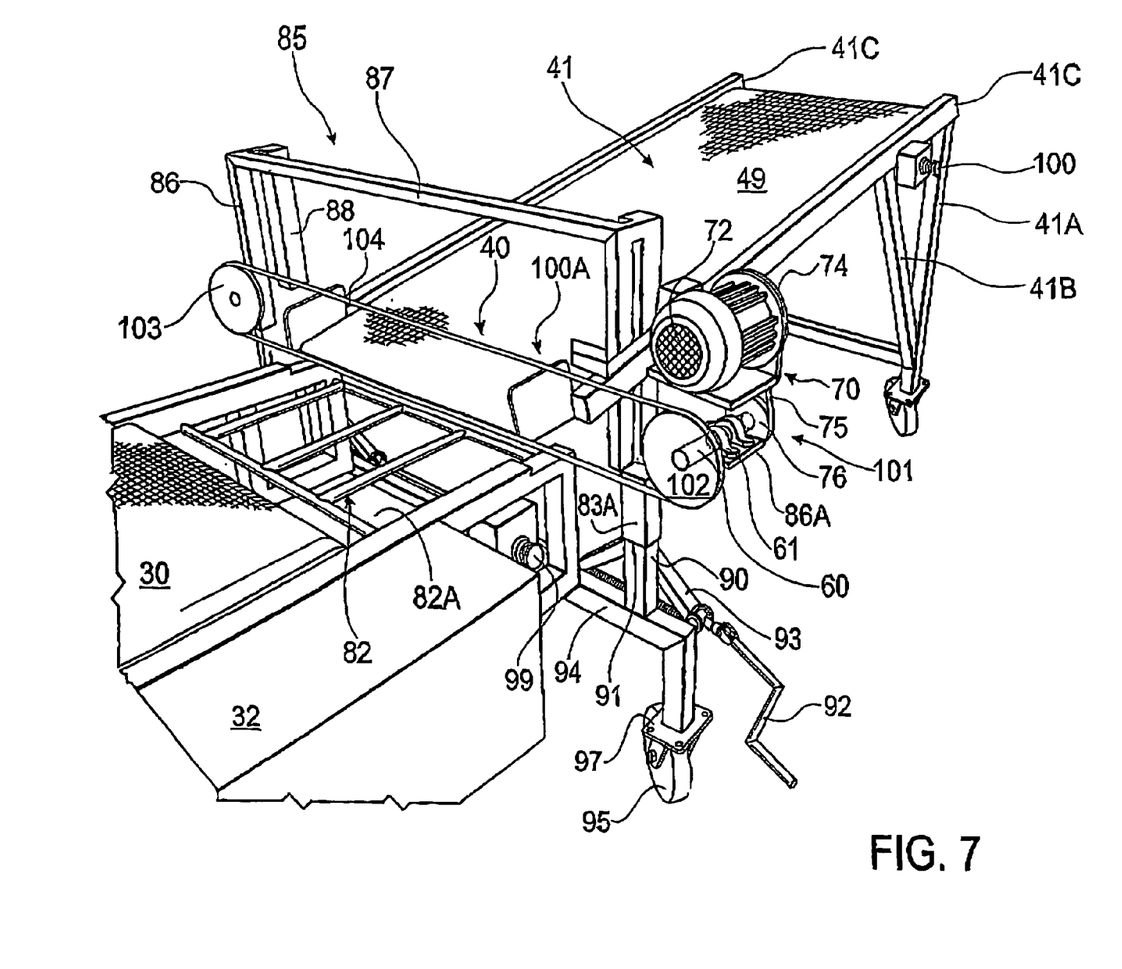
FIG. 7 shows a detailed perspective view of another form of cutting mechanism for use in the invention at the cutting station.

In relation to FIG. 7, reference is made to an alternative cutting mechanism 40 in relation to a bandsaw mechanism 100A. Bandsaw mechanism 100A is driven by drive motor 70 which is shown in FIG. 6. However, pulley 76 a connecting shaft 60 and associated bearings 61. Pulleys 102 and 103 are interconnected by bandsaw 104. Each of pulleys 102 and 103 are supported by frame 85 and more specifically frame upright 86 and mounting plate 86A. Therefore the cutting height of bandsaw 104 is adjustable having regard to telescopic engagement of frame members 91 with bottom frame member 90 as discussed in FIG. 6 which is actuated through control lever 92 and scissor jack 93 as discussed in FIG. 6.

As shown in each of the embodiments of FIGS. 6-7 seedling trays 10 are supported by stationary support grille 82 as they pass through cutting station 8. Support grille 82 spaces conveyor belt 30 from conveyor belt 49 by gap 82A to facilitate operation of cutting mechanism 40.

Figure 8:
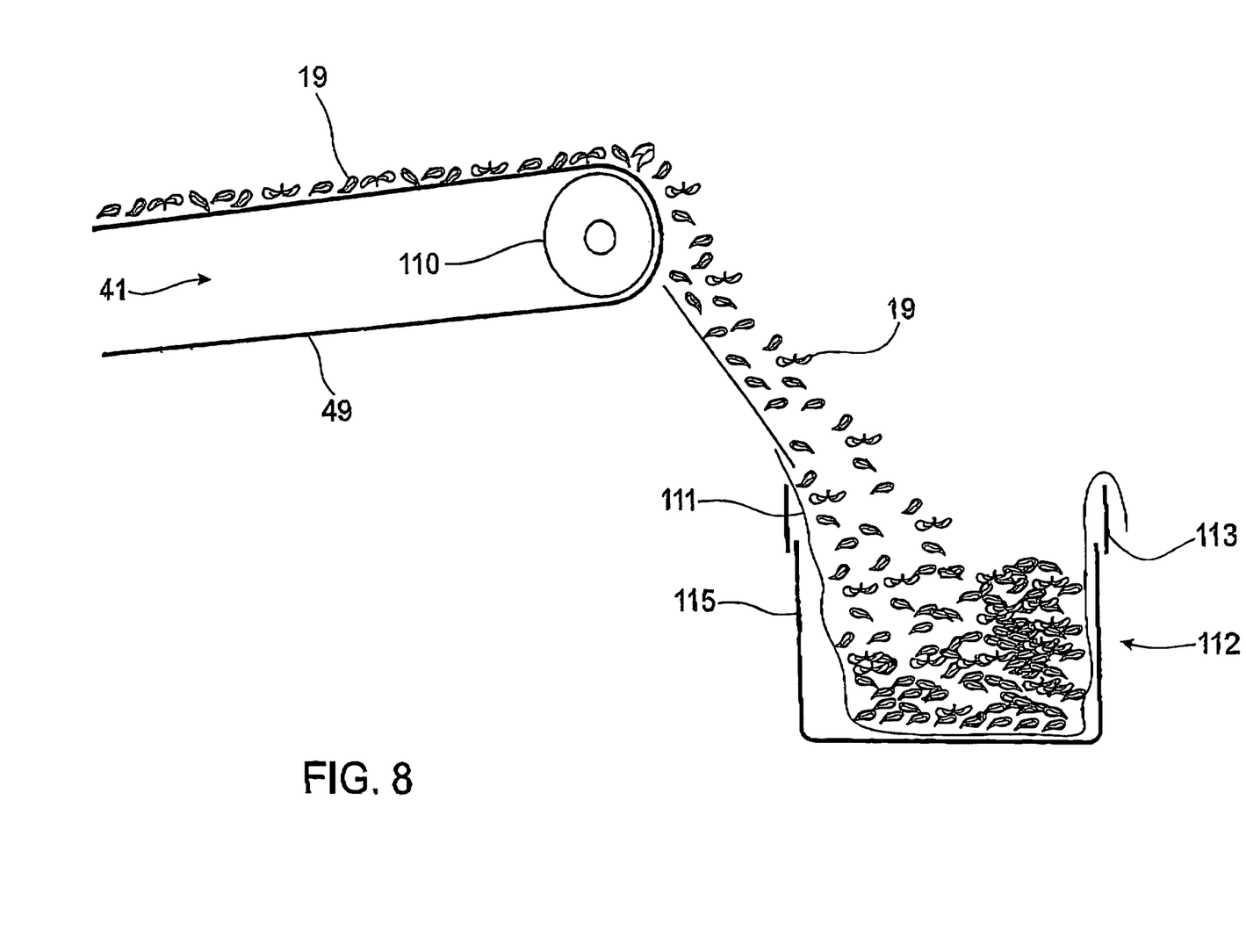
FIG. 8 shows a schematic view of a transport of leaves and depositing thereof in a collection receptacle.
Figure 9:
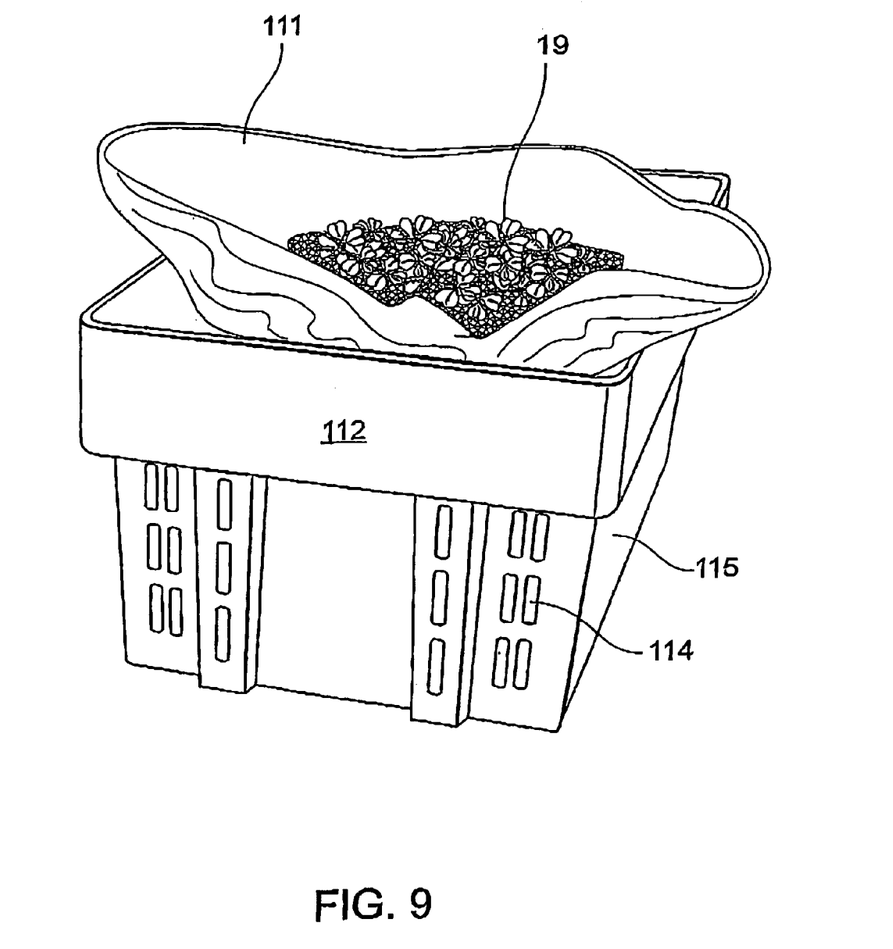
FIG. 9 is a schematic view of a storage box containing the storage bag of cut seedlings for subsequent storage or transportation.

In regard to FIG. 8, the transport of leaves 19 along conveyor belt 49 is caused by drive roller 110 and leaves 19 are then caused to be deposited in a collection receptacle such as a flexible bag 111 which is retained within a box 112 for convenience during storage and transport. The box is provided with an extended top component 113 and air holes 114 as best shown in FIG. 9. The box 112 also has a body component 115.

It therefore will be appreciated from the foregoing description of the preferred embodiments that the method and apparatus of the invention is extremely efficient in operation especially in relation to use of the same seedling tray 10 during cultivation in a greenhouse 12 and subsequent harvesting at a harvesting shed 25. This avoids double handling of removal of leaves and subsequent location in a box in the field and also provides better hygienic conditions for harvesting of salad leaves 19. The process and apparatus of the invention also avoids use of mechanical harvesters such as those described in the prior art. It will also be appreciated that the seedling trays may be cooled in a cooling room at a temperature of from 5-10° C. prior to being subjected to the cutting operation. The processing time for each seedling tray in relation to harvesting apparatus may be less than 60 seconds.

In addition the use of the technique of abutting seedling trays 10 provides momentum for each tray 10 to pass through cutting station 8 and be efficiently processed by cutting mechanism 40. This efficiency is also facilitated by the provision of gap 82A and support grill 82 and the adoption of the narrow or sharp nose 50 of conveyor belt 49. However more broadly the use of conveyor belt 36, gap 82A and support grill 82 serves primarily to distinguish the invention over the prior art discussed above and make the invention more efficient in practice.

What is claimed is:

1. A method of harvesting leafy vegetables and legumes which includes the steps of:
   (i) transporting a plurality of seedling trays wherein each seedling tray abuts each other on a conveyor belt to a cutting station;
   (ii) cutting leaves of seedlings contained in a seedling tray located at the cutting station which is spaced from an adjacent end of the conveyor belt to provide a gap between the cutting station and said adjacent end wherein said gap has a stationary support for supporting the seedling tray while the leaves are being cut;

(iii) transporting the harvesting leaves from the seedling tray on an upwardly inclined conveyor belt away from the cutting station.

2. A method as claimed in claim 1 wherein the seedlings are initially cultivated in a greenhouse wherein the seedlings are propagated and grown in the greenhouse in the same seedling tray used in step (i) above.

3. A method as claimed in claim 1 wherein after passage through the cutting station harvested seedling trays are removed from the cutting station by a conveyor to a storage location for reuse.

4. A harvesting apparatus for harvesting leafy vegetables or legumes which includes:

(i) first conveying means including an endless conveyor belt for conveying a plurality of seedling trays wherein each seedling tray has a plurality of seedlings wherein leaves of each seedling project above their associated seedling tray;

(ii) a cutting station located adjacent a proximal end of the conveyor belt and spaced therefrom to provide a gap between the cutting station and the proximal end of the conveyor belt, said cutting station having a cutting mechanism to cut the leaves from their associated stalks of a particular tray as it passes through the cutting station;

(iii) a stationary support located in the gap for supporting seedling trays as the are deposited on said stationary support by the conveyor belt before passing through the cutting station;

(iv) second conveying means for conveying cut leaves away from the cutting station, wherein the cutting mechanism is adjustable in height above the stationary support, wherein said cutting station has an upper frame which supports the cutting mechanism which is moveable relative to a lower frame so as to adjust the cutting height of the cutting mechanism above the stationary support, and wherein the upper frame has a plurality of upright frame members telescopically engaged with mating stationary lower frame members of the lower frame to provide the relevant movement of the cutting mechanism that may be required.

5. A harvesting apparatus as claimed for harvesting leafy vegetables or legumes which includes:

(v) first conveying means including an endless conveyor belt for conveying a plurality of seedling trays wherein each seedling tray has a plurality of seedlings wherein leaves of each seedling project above their associated seedling tray;

(vi) a cutting station located adjacent a proximal end of the conveyor belt and spaced therefrom to provide a gap between the cutting station and the proximal end of the conveyor belt, said cutting station having a cutting mechanism to cut the leaves from their associated stalks of a particular tray as it passes through the cutting station;

(vii) a stationary support located in the gap for supporting seedling trays as they are deposited on said stationary support by the conveyor belt before passing through the cutting station;

(viii) second conveying means for conveying cut leaves away from the cutting station, wherein the cutting mechanism is adjustable in height above the stationary support, wherein said cutting station has an upper frame which supports the cutting mechanism which is moveable relative to a lower frame so as to adjust the cutting height of the cutting mechanism above the stationary support, and wherein said harvesting apparatus further incorporating an actuating means for actuating movement of the upper frame relative to the lower frame.

6. A harvesting apparatus as claimed in claim 5 wherein the actuating means is a scissor jack which interconnects the upper and lower frames.

\* \* \* \* \*